WAVEFORM GENERATING CIRCUIT

Filed March 5, 1971 2 Sheets-Sheet 1

INVENTOR.
Peter E. Haferl
BY
H.W. Reick
ATTORNEY

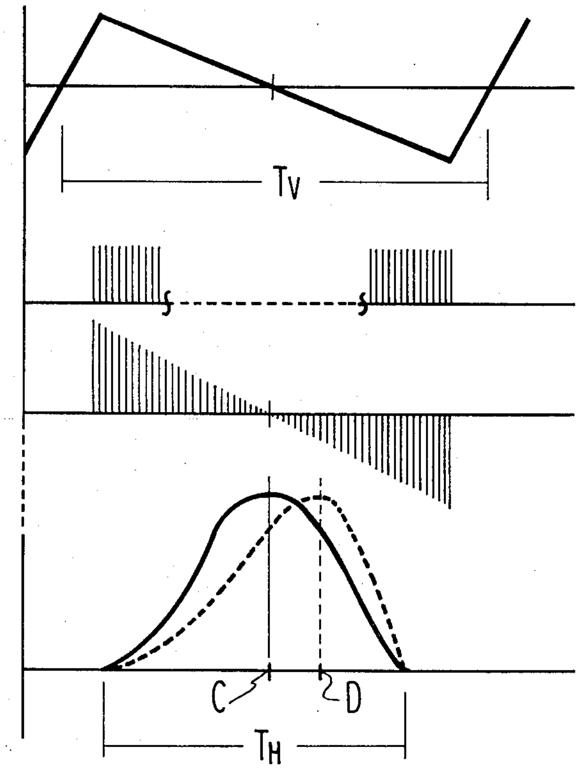
Fig. 2A. Fig. 2B. Fig. 2C. Fig. 2D.
Fig. 2.
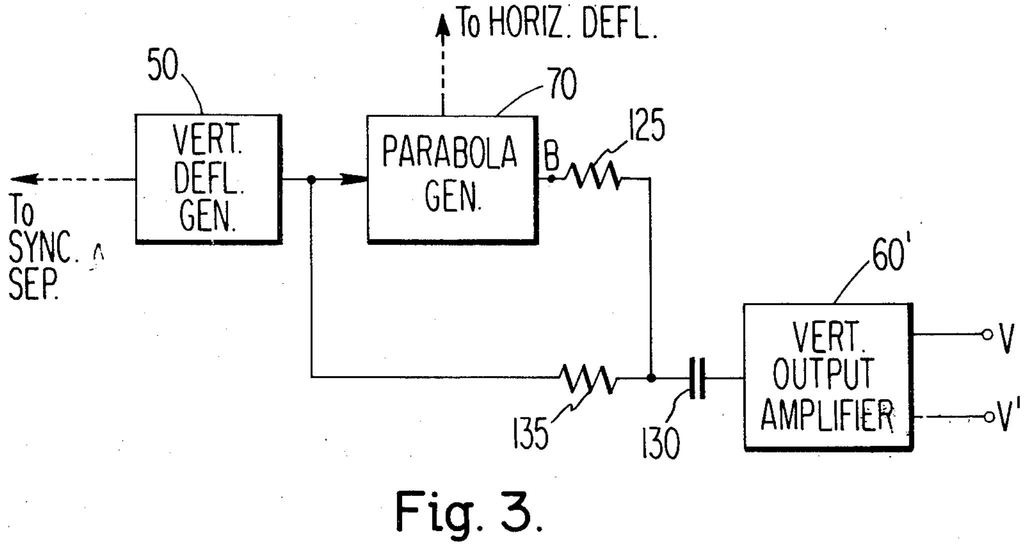
Fig. 3.
INVENTOR.
Peter E. Haferl
BY H.W. Keick
ATTORNEY United States Patent Office 3,721,857
Patented Mar. 20, 1973

3,721,857
WAVEFORM GENERATING CIRCUIT

Peter Eduard Haferl, Adliswil, Switzerland, assignor to RCA Corporation

Filed Mar. 5, 1971, Ser. No. 121,401
Claims priority, application Great Britain, Mar. 11, 1970, 11,688/70
Int. Cl. H01j 29/70
U.S. Cl. 315—27 TD 14 Claims

ABSTRACT OF THE DISCLOSURE

Parabolic top and bottom pincushion correction signals are developed by applying a vertical sawtooth signal chopped at the horizontal deflection frequency to an amplifier. The resulting horizontal rate pulses are amplitude modulated by the vertical sawtooth signal and are converted into parabolic shaped signals in the amplifier by means of a feedback path from the output to the input of the amplifier which includes a double differentiating circuit. The output signals reverse polarity at the center of each vertical deflection interval as the polarity of the vertical deflection signal changes. These output signals can be applied to suitable pincushion modulation means for providing top and bottom pincushion correction for a wide angle television display.

The present invention relates to a pincushion correction waveform generator and particularly to a parabolic waveform generator suitable for producing top and bottom pincushion correction signals.

In 110° deflection systems employed in modern television receivers, pincushion distortion is an increasingly difficult problem to solve as compared with the earlier 90° deflection systems. In some prior circuit arrangements employed with 90° deflection systems, a sinusoidal shaped correction waveform was suitable to provide an approximate correction waveform to correct for pincushion distortion. In the 110° deflection systems, however, a sinusoidal signal will not provide adequate correction for the parabolic shaped pincushion distortion. Thus, an actual parabolic shaped correction signal should be employed.

When a simple resistive-capacitive (R-C) integrator circuit which integrates sawtooth shaper horizontal frequency signals to provide a parabolic top and bottom pincushion correction waveform is used, the peak of the resulting parabolic waveform will normally occur before the middle of each horizontal scan line. This results, since the R-C time constant must be relatively fast to provide a sufficiently high peak-to-peak correction voltage necessary in a 110° deflection system. This centering problem can be corrected by increasing the time constant of the R-C network but only at a sacrifice of the amplitude of the parabolic signal.

Circuits embodying the present invention, however, provide an accurate parabolic waveform having a peak voltage whose time of occurrence can be varied by varying an R-C time constant in a feedback path of an amplifier. The feedback path further includes two differentiation stages which provide at the output of the amplifier, parabolic shaped signals in response to the horizontal rate pulses which are amplitude modulated by the vertical sawtooth and are applied to the input of the amplifier.

The features and advantages of the present invention can best be understood by referring to the figures and descriptions thereof as well as the appended claims.

In the figures:

FIG. 2 illustrates several waveform diagrams of signals at various locations in the circuitry of FIG. 1; and FIG. 3 is a block diagram showing an alternative embodiment of the present invention to provide pincushion correction for the receiver of FIG. 1.

Figure 1:
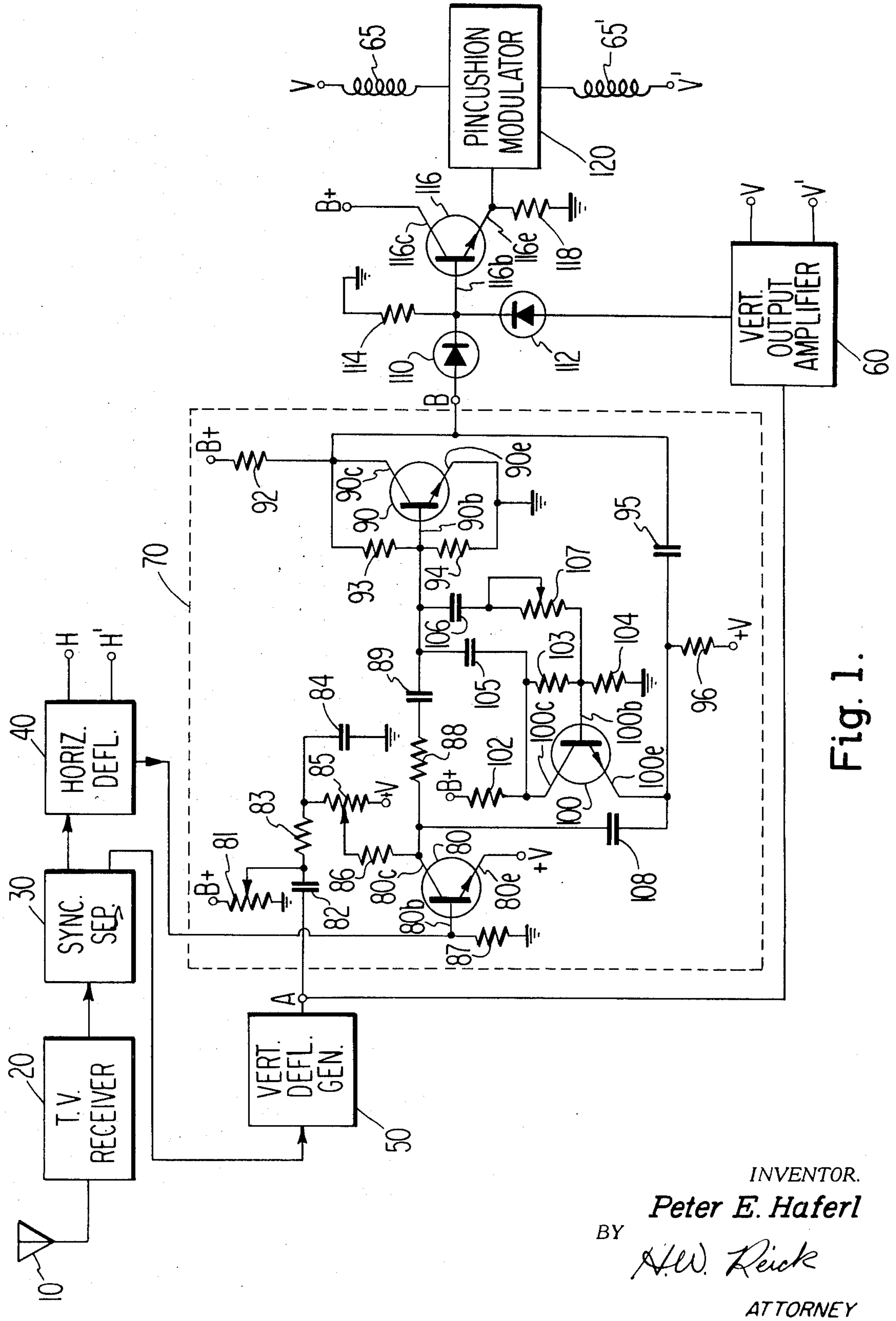
FIG. 1 is a schematic diagram partially in block diagram form of a television receiver employing the present invention.

In FIG. 1, an antenna 10 receives composite television signals and couples them to a television receiver 20 which includes a tuner, a mixer oscillator stage, I.F. amplifier stages a video detector, a video output circuit, color processing stages if a color television receiver is involved, audio detection and output circuits, and display means such as a color kinescope. The sync separator and the horizontal and vertical deflection generators as well as the circuitry of the present invention are shown separately in FIG. 1.

The receiver 20 applies composite vertical and horizontal synchronization signals and video signals to a synchronization separator stage 30 which separates the synchronization signal components from the composite signal as well as separating the vertical and horizontal synchronizing signal components. The horizontal synchronizing signals are applied to a horizontal deflection circuit 40 which develops the required horizontal deflection current applied to a horizontal deflection yoke (not shown in the figure) by means of terminals H–H'.

The vertical synchronizing signals from sync separator 30 are applied to a vertical deflection generator stage 50 which responds to the signals to develop at an output terminal A, vertical deflection rate sawtooth signals. Terminal A is coupled to a vertical output amplifier 60 which responds to the applied vertical sawtooth signal to develop the required vertical deflection current applied to a vertical deflection yoke 65, 65' by means of interconnecting terminals V–V'. The signals at terminal A are also applied to a parabola generator enclosed in the dotted line 70.

Generator 70 includes a first transistor 80, a second transistor 90 and a third transistor 100 each having base, collector and emitter electrodes **80*b*, 80*c* and 80*e*; 90*b*, 90*c* and 90*e*; and 100*b*, 100*c* and 100*e*, respectively. The collector electrode 80*c* of transistor 80 is coupled to a slider arm of an adjustable resistor 85 by means of a collector resistor 86. One end of resistor 85 is coupled to a voltage source illustrated by the symbol +V in the figure, while the opposite end of resistor 85 is coupled to the junction of a resistor 83 and a capacitor 84**.

The terminal of capacitor 84 remote from this junction is coupled to ground and the terminal of resistor 83 remote from this junction is coupled to a slider arm of an adjustable resistor 81. One end of resistor 81 is coupled to an operating voltage source illustrated by the symbol B+ in the figure, while the opposite end of resistor 81 is coupled to ground. Terminal A of the vertical deflection generator 50 is coupled to the slider arm of resistor 81 by means of a coupling capacitor 82. The emitter electrode **80*e* of transistor 80** is coupled to the +V supply. In the embodiment illustrated in FIG. 1, the B+ supply was +25 direct volts while the +V supply was +5 direct volts.

Horizontal retract pulses which occur during each horizontal flyback interval are applied to the base electrode **80*b* of transistor 80 from the horizontal deflection stage 40. These signals are shown in FIG. 2B and are of a polarity to render transistor 80 conductive during each horizontal flyback interval. A resistor 87 is coupled from base electrode 80*b* of transistor 80** to ground.

The collector electrode **80*c* of transistor 80 is coupled to the base electrode 90*b* of transistor 90 by means of the series combination of a resistor 88 and a capacitor 89. The collector electrode 90c of transistor 90 is coupled to the B+ supply by means of a collector resistor 92. A resistor 93 couples the collector electrode 90c of transistor 90 to the base electrode 90b of transistor 90 and a resistor 94 couples the base electrode 90b of transistor 90 to ground. The emitter electrode 90e of transistor 90** is coupled directly to ground.

A negative feedback path including the third transistor 100 couples the collector electrode 90c of transistor 90 to the base electrode 90b of transistor 90. This feedback path includes a first differentiating circuit comprising a capacitor 95 coupled from the collector electrode 90c of transistor 90 to the emitter electrode 100e of transistor 100 and a resistor 96 coupled from the junction of capacitor 95 and the emitter electrode 100e of transistor 100 to the +V supply. The collector electrode 100c of transistor 100 is coupled to the B+ supply by means of a resistor 102. A resistor 103 couples the collector electrode 100c of transistor 100 to the base electrode 100b of transistor 100 and a resistor 104 couples the base electrode 100b of transistor 100 to ground.

A second differentiating network includes a capacitor 105 coupled from the collector electrodes 100c of transistor 100 to the base electrode 90b of transistor 90. The input impedance of the base circuit of transistor 90 forms the resistive portion of the second differentiating circuit. A capacitor 106 is serially coupled to a pincushion phase adjustment resistor 107, the series combination being coupled from the base electrode 100b of transistor 100 to the base electrode 90b of transistor 90. A capacitor 108 is coupled from the emitter electrode 100e of transistor 100 to the collector electrode 80c of transistor 80.

The output signals developed at the collector electrode 90c of transistor 90 are applied to an output terminal B associated with generator 70. Terminal B is coupled to an emitter follower transistor 116 by means of a diode 110 having an anode electrode coupled to terminal B and a cathode electrode coupled to a base electrode 116b of transistor 116.

Diode 110 is normally conductive but is reverse biased during each vertical blanking interval by means of a positive voltage pulse developed across a resistor 114 which is coupled from the cathode of diode 110 to ground. These positive pulses are provided by the vertical output amplifier 60 and are applied to the junction of diode 110 and resistor 114 by means of a diode 112 poled to conduct the positive blanking pulses.

A collector electrode 116c of transistor 116 is coupled to the B+ supply and an emitter electrode 116e of transistor 116 is coupled to ground by means of an emitter resistor 118. Signals developed across the emitter resistor 118 are applied to a pincushion modulator circuit which may be of a variety of well known types such as a saturable reactor which responds to the top and bottom pincushion waveform to modulate an inductance in series with the horizontal deflection yoke. Likewise, the pincushion modulator circuit 120 may be of the type described in my copending United States patent application concurrently filed herewith and assigned to the present assignee, entitled "Deflection and Pincushion Correction Circuit."

The operation of the parabola generator 70 can best be understood by referring to the various waveform diagrams of FIG. 2. In FIGS. 2A, 2B and 2C, the vertical deflection interval is illustrated by the time span indicated in the figure by the symbol $T_V$, whereas the time interval in FIG. 2D is a horizontal scan interval represented by the symbol $T_H$ in the figure.

The vertical rate sawtooth signal shown in FIG. 2A is applied from the terminal A of vertical deflection generator 50 to the collector electrode 80c of transistor 80 by means of a coupling capacitor 82, a low pass filter comprising resistor 83 and capacitor 84, a pincushion amplitude control resistor 85 and a collector resistor 86. The horizontal retrace pulses shown in FIG. 2B are applied from horizontal deflection circuit 40 to the base electrode 80b of transistor 80.

Transistor 80 operates as a switching means and is rendered conductive by the applied horizontal retrace pulses, thereby chopping the applied vertical sawtooth signal at the horizontal deflection rate. The resulting signal at the collector electrode 80c of transistor 80 is shown in FIG. 2C and comprises a series of horizontal frequency pulses whose amplitude is modulated by the vertical deflection signal. The vertical sawtooth signal has a direct voltage level which may be set by resistor 81 to the +V level.

When the vertical sawtooth signal is positive with respect to the +V supply, transistor 80 conducts to clamp the collector electrode 80c to the +V supply. During the second half of each vertical deflection interval, when the vertical sawtooth signal is negative with respect to the +V supply and thus the collector of transistor 80 is also negative with respect to the +V supply, the base-to-collector junction of transistor 80 is forward biased by the applied horizontal frequency pulses and conducts to provide the negative going pulses shown in FIG. 2C.

Resistor 85 can be adjusted to vary the peak-to-peak amplitude of the vertical sawtooth signal thereby providing an amplitude adjustment for the pincushion correction signals. If asymmetric top and bottom pincushion correction is desired (i.e., if more correction is necessary for the top or the bottom portions of the television raster), resistor 81 can be adjusted to shift the direct voltage level of the applied vertical sawtooth signal, thereby providing an asymmetric correction waveform.

The voltage waveform shown in FIG. 2C is then applied to the base electrode 90b of amplifier transistor 90 by means of resistor 88 and capacitor 89. Capacitor 89 blocks the vertical sawtooth components of the signal while coupling the horizontal signal frequency components to transistor 90. An output signal at the collector electrode 90c of transistor 90 is shown in FIG. 2D. The time interval illustrated by the symbol $T_H$ is equivalent to one horizontal scan interval (i.e., approximately 53 microseconds).

As the signal on the base electrode 90b of transistor 90 rises sharply positive, the collector voltage at the collector electrode 90c swings in the negative going direction. This negative going signal is differentiated by the first differentiating circuit comprising capacitor 95 and resistor 96 and applied to the emitter electrode 100e of transistor 100 which is connected in common base amplifier configuration.

The signal at the collector electrode 100c of transistor 100 also swings sharply negative in response to the differentiated signal applied at the emitter electrode which is further differentiated by the second differentiating circuit including capacitor 105 and the input impedance of the base circuit of transistor 90 which includes resistor 94.

It is seen that as the applied signal tries to drive transistor 90 into conduction rapidly, the signal from the negative feedback path prevents this and provides a parabolic shaped signal at the output terminal B as shown by the trailing edge of the solid waveform of FIG. 2D.

Likewise, as the transistor 90 tends to turn off, the negative feedback path including the differentiation and amplifier stages tend to slow down the turn off time, thereby completing the parabolic waveform shown in FIG. 2D. The waveform shown in FIG. 2D corresponds to a horizontal scan line during the first portion of each vertical scan interval where the vertical signal is positive with respect to the +V supply. During the latter portion of each vertical deflection interval, the polarity of the waveform of FIG. 2D is reversed.

Likewise, during the vertical scanning interval, the amplitude of successive horizontal pulses varies as is illustrated in FIG. 2C. Thus, the amplitude of successive parabolic shaped correction pulses varies. The polarity of the parabolic signals at terminal B follows the polarity of the pulses at the collector electrode 80$c$ of transistor 80, since there is a double phase inversion due to the double differentiation feedback path and the phase inversion of the amplifier including transistor 90.

Without the addition of the phase control which comprises capacitor 106 and resistor 107, the peak portion of the parabolic correction signal shown in FIG. 2D will occur at some time prior to the center of horizontal scan which is indicated by the location C on the time axis of FIG. 2D. By adding capacitor 106 and resistor 107 between the base electrode 90$b$ of transistor 90 and the base electrode 100$b$ of transistor 100, the occurrence of this peak can be delayed a variable amount by varying the value of the adjustable resistor 107.

For example, if the total resistance of resistor 107 is decreased, the occurrance of the peak of the parabolic waveform may occur at point D shown in FIG. 2D. The resulting parabolic waveform is shown by the dotted waveform in FIG. 2D. Thus by adding the feedback between the base of the amplifier transistor 90 and the base of the feedback amplifier 100, the time occurrence of the peak of the parabolic waveform can be varied to supply the required pincushion phase adjustment for a given application.

The output signals present at terminal B are coupled through the forward biased diode 110 to the emitter follower amplifier 116 and develop across the emitter resistor 118 the correction signal which is applied to the pincushion modulator 120. Since pincushion correction is not necessary during the vertical blanking interval, a positive blanking signal is applied from the vertical output amplifier 60 by means of diode 112 to reverse bias diode 110 during each vertical blanking interval.

In some applications, the pincushion correction signal may be applied directly to the vertical output amplifier 60 to provide the pincushion correction instead of applying the correction signal to a pincushion modulator as shown in FIG. 1. Such an arrangement is shown in FIG. 3.

In FIG. 3, the vertical deflection generator 50 and parabola generator 70 operate in an identical manner as described in conjunction with FIG. 1. The output signals at terminal B are, however, applied to the input of the vertical output amplifier 60′ by means of a resistor 125 and a coupling capacitor 130. The vertical deflection signals from generator 50 are also coupled to the input of the vertical output amplifier 60′ by means of a resistor 135.

The combined vertical sawtooth signals and pincushion correction signals are then applied to the vertical deflection yoke by means of the interconnection terminals V–V′. In such an arrangement, it may be necessary to provide frequency selective means coupled to the yoke to match the output impedance of the vertical output amplifier to the yoke while simultaneously matching the higher frequency pincushion correction information to the yoke. A more detailed description of such an application is presented in my above-mentioned concurrently filed application entitled "Deflection and Pincushion Correction Circuit."

What is claimed is:

1. A waveform generating circuit comprising:
a source of signals of a first frequency,
a source of signals of a second frequency,
circuit means responsive to said first and said second frequency signals to provide output signals frequency related to said first frequency signals and amplitude related to said second frequency signals, and
first amplifier means coupled to said circuit means and including a negative feedback path having differentiating means, said amplifier operable to provide shaped signals occurring at said first frequency and having an amplitude which varies in accordance with the amplitude of said second frequency signals.

2. A circuit as defined in claim 1 wherein said circuit means comprises switching means responsive to said first frequency signals for chopping said second frequency signals into pulses having a frequency equal to said first frequency signals.

3. A circuit as defined in claim 2 wherein said switching means comprises a transistor having base, collector and emitter electrodes, wherein said first frequency signals are applied to said base electrode and said second frequency signals are applied to said collector electrode.

4. A circuit as defined in claim 1 wherein said second frequency signals are substantially lower than said first frequency signals.

5. A circuit as defined in claim 1 wherein said shaped signals provided by said amplifier have a parabolic waveform.

6. A waveform generating circuit comprising:
a source of signals of a first frequency,
a source of signals of a second frequency,
circuit means responsive to said first and said second frequency signals to provide output signals frequency related to said first frequency signals and amplitude related to said second frequency signals, and
first amplifier means coupled to said circuit means and including a negative feedback path including a first resistive-capacitive differentiating network, a feedback amplifier circuit coupled to said first differentiating network and a second differentiating network coupled from said feedback amplifier to an input of said first amplifier, said first amplifier operable to provide shaped signals occurring at said first frequency and having an amplitude which varies in accordance with the amplitude of said second frequency signals.

7. A circuit as defined in claim 6 wherein said feedback amplifier comprises a transistor having an emitter electrode coupled to said first differentiating network and a collector electrode coupled to said second differentiating network and a base electrode coupled to a reference potential.

8. A circuit as defined in claim 7 and further including additional feedback circuit means coupled from the input of said first amplifier to said base electrode of said feedback amplifier.

9. A circuit as defined in claim 8 wherein said additional feedback circuit means includes a series combination of a capacitor and an adjustable resistor for varying the time of occurrence of a peak portion of each of said shaped signals developed by said waveform generating circuit.

10. A pincushion correction waveform generator suitable for providing top and bottom pincushion correction signals for use in a cathode ray tube display device, said generator comprising:
a source of field frequency deflection signals divided into line frequency pulses corresponding in width to a line scanning interval, and
a first amplifier coupled to said source of signals and including a negative feedback path having a double differentiating circuit means for converting said line frequency pulses into parabolically shaped signals whose amplitude varies in accordance with said field deflection frequency signals.

11. A circuit as defined in claim 10 wherein said negative feedback path associated with said first amplifier comprises:
a first resistive-capacitive differentiating network,
a feedback amplifier circuit coupled to sad first differentiating network, and
a second differentiating network coupled from said feedback amplifier to an input of said first amplifier.

12. A circuit as defined in claim 11 wherein said feedback amplifier comprises a transistor having an input electrode coupled to said first differentiating network, an output electrode coupled to said second differentiating network and a common electrode coupled to a reference potential.

13. A circuit as defined in claim 12 and further including additional feedback circuit means coupled from the input of said first amplifier to said common electrode of said feedback amplifier included in said feedback path.

14. A circuit as defined in claim 13 wherein said additional feedback circuit means includes a series combination of a capacitor and an adjustable resistor for varying the time of occurrence of a peak portion of each of said shaped signals developed by said waveform generating circuit.

References Cited

UNITED STATES PATENTS

| | | | |
|---|---|---|---|
| 2,964,673 | 12/1960 | Stanley | 315—27 TD |
| 3,134,928 | 5/1964 | Freedman | 315—27 TD |
| 3,273,007 | 9/1966 | Schneider | 315—27 TD |
| 3,402,320 | 9/1968 | Christopher | 315—27 TD |
| 3,571,653 | 3/1971 | Hansen | 315—27 GD |

OTHER REFERENCES

Pincushion Deflection by Feedback, Johnson, H. W., I.B.M. Tech. Disc. Bulletin, vol. 10, #10, March 1968.

CARL D. QUARFORTH, Primary Examiner

P. A. NELSON, Assistant Examiner

U.S. Cl. X.R.

315—27 GD, 29